Nov. 11, 1930.                H. MOSSBACH                1,781,030
GAUGE FOR GASOLINE TANKS, ETC
Filed March 1, 1923
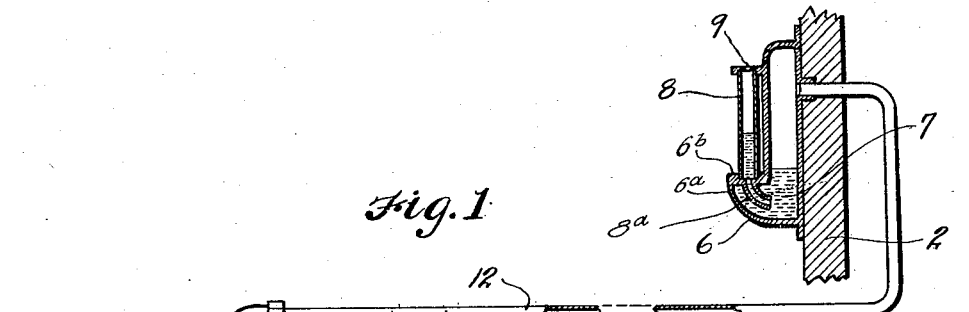
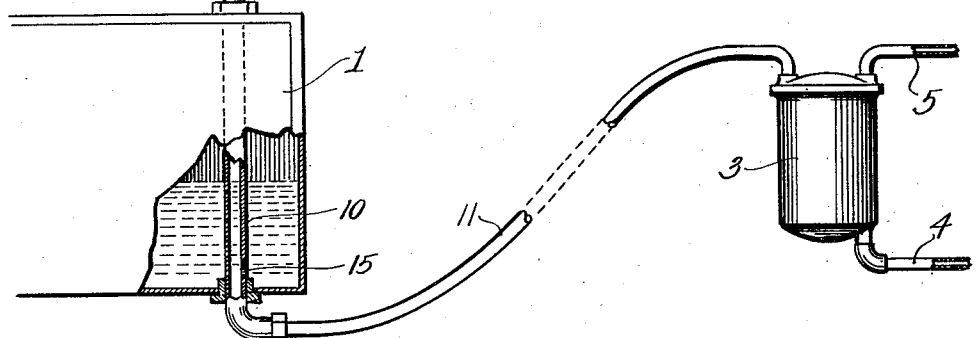
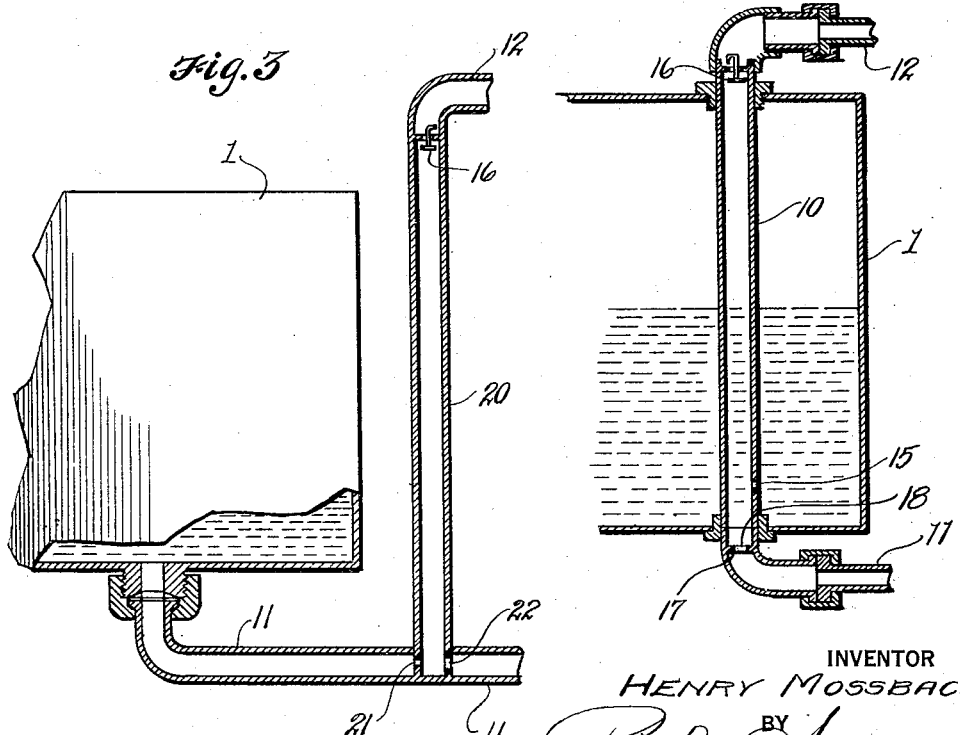
INVENTOR
HENRY MOSSBACH
BY
Richard H Cook
ATTORNEY Patented Nov. 11, 1930

1,781,030

UNITED STATES PATENT OFFICE

HENRY MOSSBACH, OF SEATTLE, WASHINGTON

GAUGE FOR GASOLINE TANKS, ETC.

Application filed March 1, 1923. Serial No. 621,981.

This invention relates to improvements in depth gauges and has for its principal object to provide a gauge suitable for use in automobiles, trucks, etc. for the purpose of indicating the amount of gasoline in the fuel supply tank.

It is a further object of the invention to provide a gauge of the above character adapted to be mounted on the dash of a vehicle, or at any other point easily seen from the driver's position, and which comprises a gauge glass with an indicating liquid movable to different levels therein in accordance with the depth of the liquid within the supply tank and under the influence of air trapped under pressure in a tube that connects the gauge with the supply tank.

In accomplishing these and other objects of the invention, I have provided the improved details of construction, the preferred forms of which are illustrated in the accompanying drawings, wherein—

Figure 1 is a diagrammatic illustration, partly in section, showing the gasoline supply tank, the gauge and connections with the latter and with the vacuum feed tank.

Figure 2 is an enlarged, sectional view of the tube extended through the supply tank, illustrating the back-check valve and bubble-check valve therein.

Figure 3 is a sectional view of an alternative construction.

Referring more in detail to the drawings—

1 designates what may be the gasoline supply tank of an automobile, 2 a part of the dash board or instrument board, and 3 the vacuum tank of a well-known feed system whereby gasoline is delivered to the carburetor of the engine; this latter tank being connected by a conduit 4 with the carburetor and by a conduit 5 with the suction manifold of the vehicle engine, not shown. The vacuum feed system is not herein illustrated in detail, but it will be stated that it operates intermittently to draw gasoline from the supply tank 1 into the tank 3 from which it is fed as used to the carburetor.

Mounted on the dash, or instrument board, 2 is a gauge, or indicator, comprising a closed housing 6 that is partially filled with a suitable indicating liquid designated at 7. The housing has a laterally offset portion $6^a$ at its lower end provided with a top wall $6^b$. A gauge glass 8 that is suitably graduated for designating the amount of gasoline in the supply tank is mounted vertically on the wall $6^b$ in communication, at its lower end, with a reduced, inwardly curved nipple $8^a$ that extends down into the housing near its bottom wall.

Extending vertically through the supply tank 1, is a tube 10 which, at its lower end, is connected with a conduit 11 that leads to the vacuum tank 3, or, in case a gravity feed system is used, it would lead directly to the carburetor. Connected with the upper end of the tube 10, is a conduit or tube 12 which leads to and opens into the housing 6 above the normal level of the indicating liquid.

Gasoline from the supply tank flows into the pressure tube 10 through a small opening 15 therein that is located near the bottom of the tank 1 and which, for a purpose presently apparent, is substantially smaller in area than the cross sectional area of the passage through the conduit 11. Within the upper end of the pressure tube 10 is provided a normally open back check valve 16, which is placed there for the purpose of preventing back pressure or splashing in the tank 1 from forcing gasoline into the gauge connecting tube 12.

I have also provided a bubble-check within the lower end of the pressure tube 10, which consists of a closing wall 17 wherein there is a small aperture 18. This aperture is of sufficient size to permit an easy flow of gasoline, but will check a back flow of bubbles due to a certain property much like capillary attraction which holds the bubbles back.

With the device so constructed and connected as shown, when the tank 1 is empty the level of liquid in the tube 8 should be made to register with the zero line on the tube.

Then, as the tank is filled, gasoline will enter the pressure tube 10 through the aperture 15, thereby trapping air within the tube and causing the indicating liquid in the housing 6 to be forced into the gauge tube; the rise of this liquid in the gauge tube indicating the height or amount of gasoline in the supply tank.

During active periods of the vacuum feed device, the liquid in tube 10 will be withdrawn together with a portion of the air contained in the tube 12 and the gauge housing chamber before liquid flows through the port 15 from the tank 1. If the reduction in pressure in the gauge housing chamber above the liquid trap 7 is sufficient, the atmospheric pressure will force air through the vent 9 forcing the indicating liquid from the tube 8 and allowing the air to bubble up through the liquid seal 7 and enter the tube 12. As soon as suction in the tube 11 stops, liquid from the supply tank will again flow into the tube 10 through the port 15 and will effect a new, accurate reading in the gauge tube.

It will be stated here that the nipple 8$^a$ that extends from the lower end of the gauge tube 8 toward the base of the housing 6 is provided for the following reasons: It is desired that the zero, or empty, mark of the gauge be located near the lower end of the gauge tube. It is required for accuracy that the liquid level in the housing be even with this mark when the supply tank is empty and while there is no air under pressure confined in the tubes 10 and 12 and upper portion of the housing 6. Now, when the liquid level in housing 6 is lowered below the end of the tube 8 by the introduction of air under pressure into the housing 6 incidental to a rise of gasoline in the tube 10 after the supply tank is filled, there is still a connection provided by the nipple 8$^a$ between the tube 8 and the housing 6 that prevents the escape of air. It can readily be seen that if the nipple 8$^a$ was not provided, air from the tube 12 and the housing 6 would escape to atmosphere by bubbling up through the liquid in the gauge tube as soon as the liquid level in the housing 6 was forced below the offset portion 6$^a$.

In Figure 3, I have illustrated an alternative construction wherein a tube 20 corresponding in purpose to the tube 10 in the other form, is located exteriorly of the tank 1 and is connected to the conduit 11, being provided at its lower end with a small port 21 into the supply tank connection and a larger port 22 into the carburetor connection. The port 21 serves the purpose of port 15 in the pressure tube 10 and the port 22 and the closing wall wherein it is contained serves as the bubble check.

It is to be understood that such systems can be used in various ways and for various purposes other than herein specified, and that changes in details of construction could be made without departing from the spirit of the invention.

It is further apparent that the system will operate successfully without the inclusion of the valve mechanism 16 or the bubble check 17; these simply being included as features of improvement.

Having thus described my invention, what I claim as new therein and desire to secure by Letters-Patent, is:

1. In combination, a gasoline supply tank, an intermittently operating suction device having a tube for withdrawing gasoline from the tank, a liquid level gauge adapted to be operated by air pressure and a pressure tube extending through the tank having connection at its lower end with the suction tube and at its upper end with the liquid level gauge, and having a relatively small port therein adjacent the base of the tank through which gasoline may flow into the tube during inactive periods of the suction device to cause a reading to be shown on the gauge in accordance with the degree of pressure created by the air that is trapped in the upper portion of the pressure tube when gasoline from the tank rises therein, the said port being of insufficient area to readily supply the suction tube in order that the upper portion of the tube will be cleared of gasoline and all air pressure removed from the gauge during active periods of the suction device.

2. In combination, a gasoline supply tank, an intermittently operating suction device having a tube for withdrawing gasoline from the tank, a liquid level gauge adapted to be operated by air pressure, a pressure tube extending through the tank having connection at its lower end with the suction tube and at its upper end with the level gauge, and having a relatively small port therein adjacent the base of the tank through which gasoline may flow into the tube during inactive periods of the suction device to cause a reading to be shown on the gauge in accordance with the degree of pressure created by the air that is trapped in the upper portion of the pressure tube when gasoline from the tank rises therein, the said port being of insufficient area to readily supply the suction tube in order that the upper portion of the pressure tube will be cleared of gasoline and all air pressure removed from the gauge during active periods of the suction device, and a back check valve located within the upper portion of the pressure tube above the level of the top of the tank and adapted to be lifted to closed position by any excessive rise of gasoline in the tube.

3. In combination, a gasoline supply tank, an intermittently operating suction device having a tube for withdrawing gasoline from the tank, a gasoline level indicating gauge adapted to be operated by air pressure and comprising a closed housing containing an indicating liquid and a vertical gauge tube communicating at its lower end with the housing, so as to receive the indicating liquid therein, and having an atmospheric opening at its upper end, a pressure tube extended vertically through the tank having connection at its lower end with the suction tube, and having connection at its upper end with the housing of the gauge at a point above the liquid level in the latter, said pressure tube having a relatively small port therein adjacent the base of the tank through which gasoline may flow into the pressure device during inactive periods of the suction tube to cause a reading to be shown on the gauge tube in accordance with the degree of pressure created by the air that is trapped in the upper portion of the pressure tube and its connection with the gauge housing incidental to rise of gasoline in the pressure tube, said port of the tube being of insufficient area to readily supply the suction tube, so that the pressure tube will be cleared of gasoline and the gauge relieved of all air pressure by the intaking of air through the atmospheric opening of the gauge tube and the connection between the gauge housing and the suction device during active periods of the suction device.

Signed at Seattle, King County, Washington, this 8th day of January, 1923.

HENRY MOSSBACH.